United States Patent
Rico Alvarino et al.

(10) Patent No.: US 12,206,504 B2
(45) Date of Patent: *Jan. 21, 2025

(54) TECHNIQUES FOR RETRANSMISSIONS IN WIRELESS COMMUNICATION SYSTEMS

(71) Applicant: QUALCOMM Incorporated, San Diego, CA (US)

(72) Inventors: Alberto Rico Alvarino, San Diego, CA (US); Kazuki Takeda, Tokyo (JP); Le Liu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/460,048

(22) Filed: Sep. 1, 2023

(65) Prior Publication Data

US 2023/0412313 A1 Dec. 21, 2023

Related U.S. Application Data

(63) Continuation of application No. 16/934,961, filed on Jul. 21, 2020.
(Continued)

(51) Int. Cl.
*H04L 1/1812* (2023.01)
*H04L 1/1829* (2023.01)
(Continued)

(52) U.S. Cl.
CPC .......... *H04L 1/1812* (2013.01); *H04L 1/1861* (2013.01); *H04L 5/0055* (2013.01);
(Continued)

(58) Field of Classification Search
CPC ... H04L 1/1812; H04L 1/1822; H04L 1/1845; H04L 1/1861; H04L 5/0037;
(Continued)

(56) References Cited

U.S. PATENT DOCUMENTS

| | | | |
|---|---|---|---|
| 7,536,622 | B2 | 5/2009 | Leon et al. |
| 7,586,930 | B2 | 9/2009 | Koski |

(Continued)

FOREIGN PATENT DOCUMENTS

| | | |
|---|---|---|
| AU | 2018396965 B2 | 11/2021 |
| AU | 2018396965 C1 | 4/2022 |

(Continued)

OTHER PUBLICATIONS

International Search Report and Written Opinion—PCT/US2020/043104—ISA/EPO—Nov. 5, 2020.

*Primary Examiner* — Eric Nowlin
(74) *Attorney, Agent, or Firm* — Arent Fox, LLP

(57) ABSTRACT

Aspects described herein relate to retransmission implementations in new radio (NR) wireless communication systems. In one aspect, a network entity may initially perform a multicast transmission and then a multicast retransmission according to a hybrid automatic repeat request (HARQ) process. In another aspect, a user equipment (UE) may initially receive a multicast transmission from a network entity and a subsequent multicast transmission according to a HARQ process. In an additional aspect, a network entity may initially perform a multicast transmission and then a subsequent unicast retransmission according to a HARQ process. In yet another aspect, a UE may initially receive a multicast transmission from a network entity and a subsequent unicast transmission according to a HARQ process.

30 Claims, 8 Drawing Sheets

Related U.S. Application Data

(60) Provisional application No. 62/879,043, filed on Jul. 26, 2019.

(51) Int. Cl.
*H04L 5/00* (2006.01)
*H04L 27/26* (2006.01)
*H04W 72/23* (2023.01)
*H04W 76/11* (2018.01)

(52) U.S. Cl.
CPC ......... *H04L 27/2613* (2013.01); *H04W 72/23* (2023.01); *H04W 76/11* (2018.02)

(58) Field of Classification Search
CPC ............... H04L 5/0055; H04L 27/2613; H04L 2001/0093; H04W 72/042; H04W 72/14; H04W 76/11; H04W 76/40
See application file for complete search history.

(56) References Cited

U.S. PATENT DOCUMENTS

| | | | |
|---|---|---|---|
| 8,582,484 B2 | 11/2013 | Lohr et al. | |
| 8,654,661 B2 | 2/2014 | Wang et al. | |
| 9,100,179 B2 | 8/2015 | Ho et al. | |
| 9,210,552 B2 | 12/2015 | Kim et al. | |
| 9,712,982 B2 | 7/2017 | Urabayashi et al. | |
| 9,844,095 B2 | 12/2017 | Urabayashi et al. | |
| 10,123,376 B2 | 11/2018 | Siomina et al. | |
| 10,440,607 B2 | 10/2019 | Fujishiro et al. | |
| 10,721,024 B2 | 7/2020 | Seo | |
| 10,833,829 B2 * | 11/2020 | Lee | H04L 1/1896 |
| 10,924,223 B2 | 2/2021 | Ye | |
| 10,999,014 B2 * | 5/2021 | Tian | H04L 1/1864 |
| 11,025,371 B2 | 6/2021 | Zhang et al. | |
| 11,044,748 B2 | 6/2021 | Cao et al. | |
| 11,057,156 B2 | 7/2021 | Hong et al. | |
| 11,259,360 B2 | 2/2022 | Saily et al. | |
| 11,581,983 B2 * | 2/2023 | Zewail | H04L 1/1874 |
| 11,588,586 B2 * | 2/2023 | Park | H04L 5/0055 |
| 11,778,654 B2 * | 10/2023 | Zhang | H04L 1/1854 370/311 |
| 11,791,943 B2 * | 10/2023 | Rico Alvarino | H04L 1/1812 370/329 |
| 2009/0031183 A1 | 1/2009 | Hoshino et al. | |
| 2009/0204865 A1 | 8/2009 | Leon et al. | |
| 2010/0081443 A1 | 4/2010 | Meyer et al. | |
| 2017/0026963 A1 * | 1/2017 | Zhang | H04W 72/21 |
| 2018/0302868 A1 | 10/2018 | Bhorkar et al. | |
| 2019/0109678 A1 | 4/2019 | Rollet | |
| 2019/0123923 A1 | 4/2019 | Belleschi et al. | |
| 2019/0132104 A1 * | 5/2019 | Lee | H04W 4/40 |
| 2020/0052832 A1 * | 2/2020 | Tian | H04L 1/1614 |
| 2020/0205190 A1 * | 6/2020 | Manolakos | H04L 5/003 |
| 2021/0006360 A1 * | 1/2021 | Asterjadhi | H04L 1/1819 |
| 2021/0028890 A1 | 1/2021 | Rico Alvarino et al. | |
| 2021/0135795 A1 * | 5/2021 | Park | H04L 5/0055 |
| 2021/0314127 A1 | 10/2021 | Stern-Berkowitz et al. | |
| 2022/0006571 A1 | 1/2022 | Basu Mallick et al. | |
| 2023/0019024 A1 | 1/2023 | Stare et al. | |

FOREIGN PATENT DOCUMENTS

| | | | | |
|---|---|---|---|---|
| CN | 107251588 B | | 3/2021 | |
| CN | 113785516 A | | 12/2021 | |
| CN | 113938839 A | | 1/2022 | |
| CN | 114097188 A | * | 2/2022 | ............ H04L 1/1614 |
| CN | 114586305 A | * | 6/2022 | ............ H04L 1/1819 |
| EP | 1722506 A1 | | 11/2006 | |
| EP | 2026491 A1 | | 2/2009 | |
| EP | 1722506 B1 | | 9/2010 | |
| EP | 2662993 A2 | | 11/2013 | |
| EP | 2179527 B1 | | 11/2014 | |
| EP | 3051727 A1 | | 8/2016 | |
| EP | 3282725 A1 | | 2/2018 | |
| EP | 3282725 B1 | | 10/2019 | |
| EP | 3155854 B1 | | 3/2021 | |
| EP | 3402109 B1 | | 12/2021 | |
| JP | 2010536287 A | | 11/2010 | |
| JP | 5172957 B2 | | 3/2013 | |
| JP | 6302135 B2 | | 3/2018 | |
| JP | 2018113706 A | | 7/2018 | |
| JP | 6668399 B2 | | 3/2020 | |
| WO | 2009021579 A1 | | 2/2009 | |
| WO | 2010030806 A1 | | 3/2010 | |
| WO | 2012093828 A2 | | 7/2012 | |
| WO | 2015171063 A1 | | 11/2015 | |
| WO | 2016163548 A1 | | 10/2016 | |
| WO | 2017119771 A1 | | 7/2017 | |
| WO | WO-2017192009 A1 | * | 11/2017 | ............ H04L 1/1607 |
| WO | WO-2020033815 A1 | * | 2/2020 | ............ H04L 1/0003 |
| WO | 2020172764 A1 | | 9/2020 | |
| WO | WO-2021003228 A1 | * | 1/2021 | ............ H04L 1/1614 |
| WO | 2021021525 | | 2/2021 | |
| WO | WO-2021041017 A1 | * | 3/2021 | ............ H04L 1/1812 |
| WO | WO-2021087100 A1 | * | 5/2021 | ............ H04L 1/1819 |
| WO | 2022001934 A1 | | 1/2022 | |

\* cited by examiner

TECHNIQUES FOR RETRANSMISSIONS IN WIRELESS COMMUNICATION SYSTEMS

CROSS-REFERENCE TO RELATED APPLICATION(S)

This application is a continuation of U.S. application Ser. No. 16/934,961, entitled "TECHNIQUES FOR RETRANSMISSIONS IN WIRELESS COMMUNICATION SYSTEMS" and filed on Jul. 21, 2020, which claims the benefit of U.S. Provisional Application Ser. No. 62/879,043, entitled "TECHNIQUES FOR RETRANSMISSIONS IN WIRELESS COMMUNICATION SYSTEMS" and filed on Jul. 26, 2019, which are expressly incorporated by reference herein in their entirety.

BACKGROUND

Aspects of the present disclosure relate generally to wireless communication systems, and more particularly, to retransmission aspects in new radio (NR) multicast.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

For example, for various communications technology such as, but not limited to NR, mixed mode changes may increase transmission speed and flexibility but also retransmission complexity. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication at a network entity is provided. The method may include transmitting first multicast data to a plurality of user equipments (UEs) on at least one downlink communication channel. The method may further include receiving, on an uplink communication channel, a negative acknowledgement (NACK) from one or more UEs from the plurality of UEs in response to the first multicast data transmission. The method may further include transmitting second multicast data including at least a portion of the first multicast data to the one or more UEs according to a hybrid automatic repeat request (HARQ) process.

In a further aspect, the present disclosure includes an apparatus for wireless communication including a memory and at least one processor coupled to the memory. The at least one processor may be configured to transmit first multicast data to a plurality of UEs on at least one downlink communication channel. The at least one processor may further be configured to receive, on an uplink communication channel, a NACK from one or more UEs from the plurality of UEs in response to the first multicast data transmission. The at least one processor may further be configured to transmit second multicast data including at least a portion of the first multicast data to the one or more UEs according to a HARQ process.

In an additional aspect, the present disclosure includes an apparatus for wireless communication including means for transmitting first multicast data to a plurality of UEs on at least one downlink communication channel. The apparatus may further include means for receiving, on an uplink communication channel, a NACK from one or more UEs from the plurality of UEs in response to the first multicast data transmission. The apparatus may further include means for transmitting second multicast data including at least a portion of the first multicast data to the one or more UEs according to a HARQ process.

In yet another aspect, the present disclosure includes a non-transitory computer-readable medium storing computer executable code, the code when executed by a processor cause the processor to transmit first multicast data to a plurality of UEs on at least one downlink communication channel. The non-transitory computer-readable medium may further include code when executed by a processor cause the processor to receive, on an uplink communication channel, a NACK from one or more UEs from the plurality of UEs in response to the first multicast data transmission, and transmit second multicast data including at least a portion of the first multicast data to the one or more UEs according to a HARQ process.

According to another example, a method of wireless communication at a UE is provided. The method may include receiving, on a downlink communication channel from a network entity, first multicast data from a network entity. The method may further include determining that at least a portion of data from the first multicast data has not been received. The method may further include transmitting, on an uplink communication channel to the network entity, a NACK to the network entity according to a HARQ process in response to determining that at least the portion of the data has not been received. The method may further include receiving second multicast data including at least the first multicast portion of the data according to the HARQ process in response to transmitting the NACK to the network entity.

In a further aspect, the present disclosure includes an apparatus for wireless communication including a memory and at least one processor coupled to the memory. The at least one processor may be configured to receive, on a downlink communication channel from a network entity, first multicast data from a network entity. The at least one processor may be configured to determine that at least a portion of data from the first multicast data has not been received. The at least one processor may be configured to transmit, on an uplink communication channel to the network entity, a NACK to the network entity according to a HARQ process in response to determining that at least the portion of the data has not been received. The at least one processor may be configured to receive second multicast data including at least the first multicast portion of the data according to the HARQ process in response to transmitting the NACK to the network entity.

In an additional aspect, the present disclosure includes an apparatus for wireless communication including means for receiving, on a downlink communication channel from a network entity, first multicast data from a network entity. The apparatus may further include means for determining that at least a portion of data from the first multicast data has not been received. The apparatus may further include means for transmitting, on an uplink communication channel to the network entity, a NACK to the network entity according to a HARQ process in response to determining that at least the portion of the data has not been received. The apparatus may further include means for receiving second multicast data including at least the first multicast portion of the data according to the HARQ process in response to transmitting the NACK to the network entity.

In yet another aspect, the present disclosure includes a non-transitory computer-readable medium storing computer executable code, the code when executed by a processor cause the processor to receive, on a downlink communication channel from a network entity, first multicast data from a network entity. The non-transitory computer-readable medium may further include code when executed by a processor cause the processor to determine that at least a portion of data from the first multicast data has not been received, transmit, on an uplink communication channel to the network entity, a NACK to the network entity according to a HARQ process in response to determining that at least the portion of the data has not been received, and receive second multicast data including at least the first multicast portion of the data according to the HARQ process in response to transmitting the NACK to the network entity.

According to an example, a method of wireless communication at a network entity is provided. The method may include transmitting multicast data to a plurality of UEs on at least one downlink communication channel. The method may further include receiving, on an uplink communication channel, a NACK from at least one UE of the plurality of UEs in response to the multicast data transmission. The method may further include transmitting unicast data including at least a portion of the multicast data according to a HARQ process to the at least one UE.

In a further aspect, the present disclosure includes an apparatus for wireless communication including a memory and at least one processor coupled to the memory. The at least one processor may be configured to transmit multicast data to a plurality of UEs on at least one downlink communication channel. The at least one processor may be configured to receive, on an uplink communication channel, a NACK from at least one UE of the plurality of UEs in response to the multicast data transmission. The at least one processor may be configured to transmit unicast data including at least a portion of the multicast data according to a HARQ process to the at least one UE.

In an additional aspect, the present disclosure includes an apparatus for wireless communication including means for transmitting multicast data to a plurality of UEs on at least one downlink communication channel. The apparatus may further include means for receiving, on an uplink communication channel, a NACK from at least one UE of the plurality of UEs in response to the multicast data transmission. The apparatus may further include means for transmitting unicast data including at least a portion of the multicast data according to a HARQ process to the at least one UE.

In yet another aspect, the present disclosure includes a non-transitory computer-readable medium storing computer executable code, the code when executed by a processor cause the processor to transmit multicast data to a plurality of UEs on at least one downlink communication channel. The non-transitory computer-readable medium may further include code when executed by a processor cause the processor to receive, on an uplink communication channel, a NACK from at least one UE of the plurality of UEs in response to the multicast data transmission, and transmit unicast data including at least a portion of the multicast data according to a HARQ process to the at least one UE.

According to another example, a method of wireless communication at a UE is provided. The method may include receiving, on a downlink communication channel from a network entity, multicast data from a network entity. The method may further include determining that at least a portion of data from the multicast data has not been received via the multicast data transmission. The method may further include transmitting, on an uplink communication channel to the network entity, a NACK to the network entity according to a HARQ process in response to determining that at least the portion of the multicast data has not been received. The method may further include receiving unicast data including at least the portion of the multicast data according to the HARQ process in response to transmitting the NACK to the network entity.

In a further aspect, the present disclosure includes an apparatus for wireless communication including a memory and at least one processor coupled to the memory. The at least one processor may be configured to receive, on a downlink communication channel from a network entity, multicast data from a network entity. The at least one processor may be configured to determine that at least a portion of data from the multicast data has not been received via the multicast data transmission. The at least one processor may be configured to transmit, on an uplink communication channel to the network entity, a NACK to the network entity according to a HARQ process in response to determining that at least the portion of the multicast data has not been received. The at least one processor may be configured to receive unicast data including at least the portion of the multicast data according to the HARQ process in response to transmitting the NACK to the network entity.

In an additional aspect, the present disclosure includes an apparatus for wireless communication including means for receiving, on a downlink communication channel from a network entity, multicast data from a network entity. The apparatus may further include means for determining that at least a portion of data from the multicast data has not been received via the multicast data transmission. The apparatus may further include means for transmitting, on an uplink communication channel to the network entity, a NACK to the network entity according to a HARQ process in response to determining that at least the portion of the multicast data has not been received. The apparatus may further include means for receiving unicast data including at least the portion of the multicast data according to the HARQ process in response to transmitting the NACK to the network entity.

In yet another aspect, the present disclosure includes a non-transitory computer-readable medium storing computer executable code, the code when executed by a processor cause the processor to receive, on a downlink communication channel from a network entity, multicast data from a network entity. The non-transitory computer-readable medium may further include code when executed by a processor cause the processor to determine that at least a portion of data from the multicast data has not been received via the multicast data transmission, transmit, on an uplink communication channel to the network entity, a NACK to the network entity according to a HARQ process in response to determining that at least the portion of the multicast data has not been received, and receive unicast data including at least the portion of the multicast data according to the HARQ process in response to transmitting the NACK to the network entity.

In an aspect, a method of communications at a network entity is provided that includes transmitting, on a downlink communication channel for a UE and based at least in part on a first identifier associated with the UE, a multicast data transmission comprising first multicast data, receiving, on an uplink communication channel for the UE, a negative acknowledgment (NACK) according to a first hybrid automatic repeat request (HARQ) process indicating that at least a portion of the first multicast data has not been received, and transmitting, on the downlink communication channel or another downlink communication channel for the UE and based at least in part on a second identifier associated with the UE that is different from the first identifier, a unicast data transmission comprising unicast data, the unicast data transmission using a HARQ process identifier associated with the first HARQ process and different from the first identifier and the second identifier, where the unicast data includes at least the portion of the first multicast data.

In another aspect, a method of communications at a network node is provided that includes transmitting, on a downlink communication channel for a UE and based at least in part on a first identifier associated with the UE, a multicast data transmission comprising first multicast data, receiving, on an uplink communication channel for the UE, a NACK according to a first HARQ process based on identifying that at least a portion of the first multicast data has not been received, transmitting a grant for a unicast data retransmission based on a group radio network temporary identifier (G-RNTI) and downlink control information (DCI) mapped to a UE-specific search space, and transmitting, on a downlink communication channel for the UE and based on receiving the NACK, the unicast data retransmission comprising unicast data that includes at least the portion of the first multicast data, the unicast data retransmission using the first HARQ process.

In another aspect, an apparatus for wireless communication is provided that includes a transceiver, one or more memories configured to store instructions, and one or more processors communicatively coupled with the transceiver and the one or more memories. The one or more processors are configured to cause the apparatus to transmit, on a downlink communication channel for a UE and based at least in part on a first identifier associated with the UE, a multicast data transmission comprising first multicast data, receive, on an uplink communication channel for the UE, a NACK according to a first HARQ process indicating that at least a portion of the first multicast data has not been received, and transmit, on the downlink communication channel or another downlink communication channel for the UE and based at least in part on a second identifier associated with the UE that is different from the first identifier, a unicast data transmission comprising unicast data, the unicast data transmission using a HARQ process identifier associated with the first HARQ process and different from the first identifier and the second identifier, where the unicast data includes at least the portion of the first multicast data.

In another aspect, an apparatus for wireless communication is provided that includes a transceiver, one or more memories configured to store instructions, and one or more processors communicatively coupled with the transceiver and the one or more memories. The one or more processors are configured to cause the apparatus to transmit, on a downlink communication channel for a UE and based at least in part on a first identifier associated with the UE, a multicast data transmission comprising first multicast data, receive, on an uplink communication channel for the UE, a NACK according to a first HARQ process based on identifying that at least a portion of the first multicast data has not been received, transmit a grant for a unicast data retransmission based on a G-RNTI and DCI mapped to a UE-specific search space, and transmit, on a downlink communication channel for the UE and based on receiving the NACK, the unicast data retransmission comprising unicast data that includes at least the portion of the first multicast data, the unicast data retransmission using the first HARQ process.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
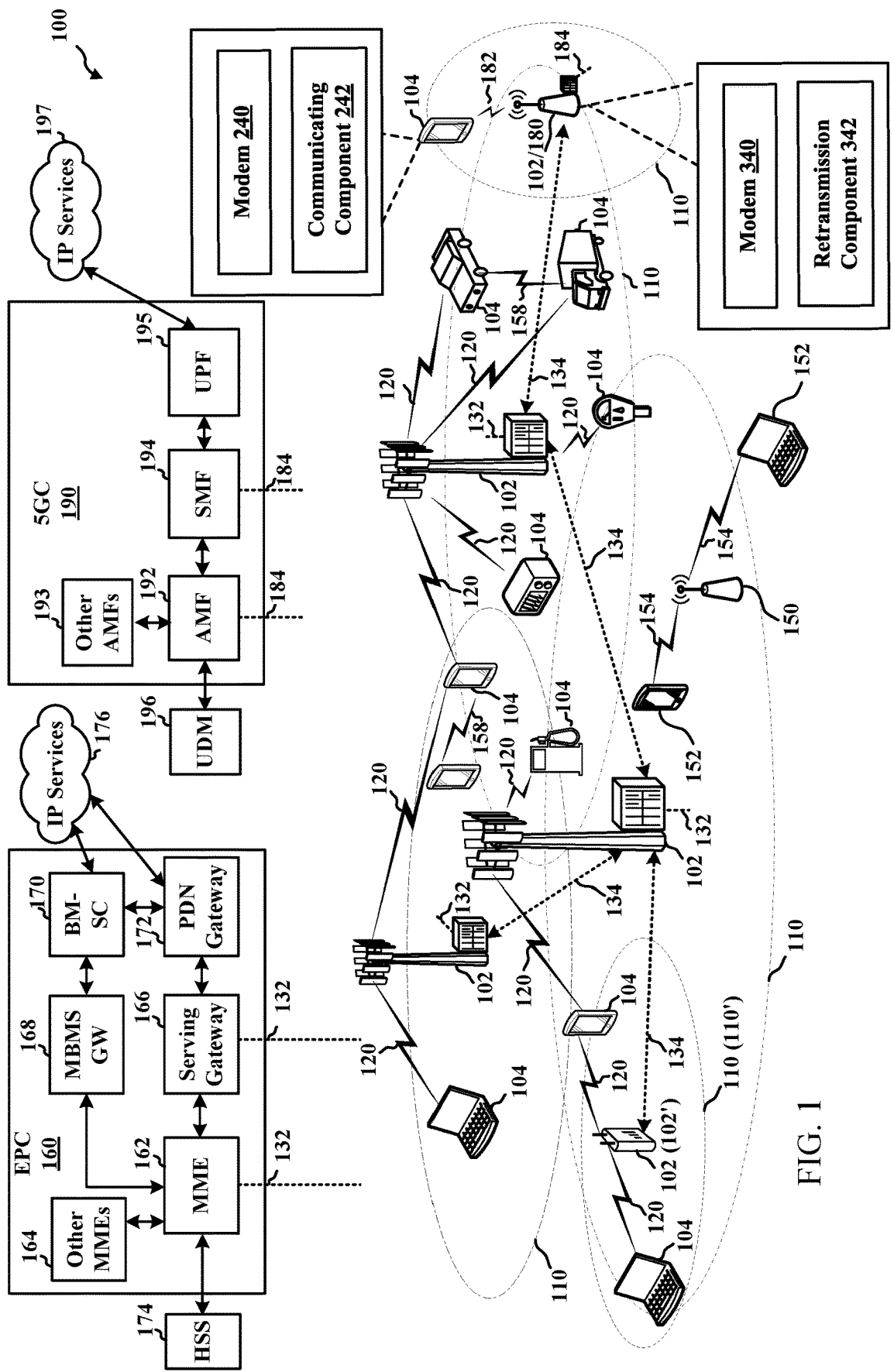
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to retransmission aspects of new radio (NR) multicast transmissions. Specifically, NR may support very high data rates with lower latency. NR may further support mixed mode transmissions/retransmissions. That is, in some wireless communication systems, a radio access network (RAN) may allow for dynamic change or switching between multicast and unicast transmissions/retransmissions. For example, a user equipment (UE) may communicate using a dedicated unicast service that provides two-way point-to-point communication between the UE and the network (e.g., via a network entity and/or base station). In another example, a network may communicate with multiple UEs corresponding to a multicast service. Multicast transmissions may efficiently use spectrum resources, which may allow the same copy of content to be sent to multiple UEs instead of sending multiple copies of the same content to multiple UEs.

For instance, NR may support a number of modes of operation when delivering multicast traffic, also referred to as mixed mode. A first mode may correspond to a multicast transmission and a multicast retransmission. The first mode may support retransmissions to a large number of UEs when the UEs failed to receive the initial transmission. A second mode may correspond to a multicast transmission and a unicast retransmission. The second mode may support retransmissions for a small number of UEs, which in some cases may be more efficient in delivering data. A third mode may correspond to an initial unicast transmission and a multicast retransmission.

As part of increasing the reliability of transmissions in NR mixed mode, hybrid automatic repeat request (HARQ) retransmissions may be implemented. For instance, as HARQ is implemented according to a low latency scheme in NR (i.e., in TDD), implementing HARQ retransmissions may increase the reliability of transmissions in NR compared to, for example, radio link control (RLC) retransmissions. As such, a HARQ process and/or retransmission management scheme may be desired to support HARQ for mixed mode NR transmissions.

In one implementation, a network entity may support multicast transmissions and multicast retransmissions. Specifically, the network entity may transmit first multicast data to a plurality of UEs on at least one downlink communication channel. The network entity may receive, on an uplink communication channel, a negative acknowledgement (NACK) from one or more UEs from the plurality of UEs in response to the first multicast data transmission. The network entity may further transmit second multicast data including at least a portion of the first multicast data to the one or more UEs according to a HARQ process.

In another implementation, a UE may support multicast receptions for both multicast transmissions and retransmissions from a network entity. Specifically, the UE may receive, on a downlink communication channel from a network entity, first multicast data from a network entity. The UE may further determine that at least a portion of data from the first multicast data has not been received. The UE may further transmit, on an uplink communication channel to the network entity, a NACK to the network entity according to a HARQ process in response to determining that at least the portion of the data has not been received. The UE may further receive second multicast data including at least the portion of the first multicast data according to the HARQ process and in response to transmitting the NACK to the network entity.

In an additional implementation, a network entity may support multicast transmissions and unicast retransmissions. Specifically, the network entity may transmit multicast data to a plurality of UEs on at least one downlink communication channel. The network entity may further receive, on an uplink communication channel, a NACK from at least one UE of the plurality of UEs in response to the multicast data transmission. The network entity may further transmit unicast data including at least a portion of the multicast data according to a HARQ process to the at least one UE.

In yet another implementation, a UE may support an initial multicast reception and a subsequent unicast reception of a unicast retransmission by a network entity. Specifically, the UE may receive, on a downlink communication channel from a network entity, multicast data from a network entity. The UE may determine that at least a portion of data from the multicast data has not been received via the multicast data transmission. The UE may transmit, on an uplink communication channel to the network entity, a NACK to the network entity according to a HARQ process and in response to determining that at least the portion of the multicast data has not been received. The UE may further receive unicast data including at least the portion of the multicast data according to the HARQ process in response to transmitting the NACK to the network entity.

The described features will be presented in more detail below with reference to FIGS. 1-8.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102, which may also be referred to as network entities, may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes such as UE 104 of the wireless communication system may have a modem 240 and communicating component 242 for performing HARQ processes based on missing multicast data received from the base station 102/gNB 180, as described herein. In addition, some nodes such as base station 102 may have a modem 340 and retransmission component 342 for facilitating HARQ multicast and unicast transmissions and retransmissions, as described herein. Though a UE 104 is shown as having the modem 240 and communicating component 242 and a base station 102/gNB 180 is shown as having the modem 340 and retransmission component 342, this is one illustrative example, and substantially any node or type of node may include a modem 240 and communicating component 242 and/or a modem 340 and retransmission component 342 for providing corresponding functionalities described herein.

For example, in one implementation, both the base stations 102, which include the retransmission component 342, and UEs 104, which include the communication component 242, may support multicast transmissions and multicast retransmissions (e.g., first mode). Specifically, the arrangement of a number of HARQ processes used for multicast may be configured. This configuration may be common across all UEs 104 in the same multicast group (i.e., monitoring the same group radio network temporary identifier (G-RNTI)). The same procedures as unicast transmissions and retransmissions may apply in this case (with respect to a new data indicator (NDI), HARQ identifier (ID), etc.).

A number of implementations may be provided regarding support for a total number of unicast plus multicast/broadcast HARQ processes. In a first aspect of the first mode, a disjoint set of HARQ processes may be provided such that the UE 104 may be able to keep track of both multicast and unicast HARQ processes. There may be a limitation on the total number of HARQ processes per serving cell (e.g., unicast plus multicast HARQ processes). In one aspect, the limitation may be based on a configuration, e.g., a total number of configured unicast plus configured multicast HARQ processes satisfying a threshold limit value (e.g., less than or equal to the threshold limit value). In another aspect, the number of HARQ processes for unicast may be configured (e.g. 16), and then separately the number of HARQ processes for multicast may be configured (e.g. 4). The HARQ processes for multicast may be taken from the unicast (e.g. the UE 104 may not be expected to be scheduled with HARQ processes 11 . . . 15 with this configuration).

In a second aspect of the first mode, HARQ processes may be shared across multicast and unicast transmissions. For example, the base stations 102 (e.g., eNB) may keep track of the UEs 104 that are receiving multicast data, and subsequently dynamically reuse the multicast/broadcast HARQ processes when they are not being used for unicast. An NDI may be used when switching between unicast and broadcast. Further, for each active HARQ process, the UE 104 may store whether the transport block (TB) corresponds to a unicast or multicast transmission.

The base station 102 and/or UE 104 may also separately store the NDI for unicast and multicast. For instance, storing such data may be useful at the base station 102 to protect against the case where the UE 104 may miss a downlink control information (DCI). At the UE 104, if a new grant is received, the communicating component 242 may clear a buffer and consider a NDI to be toggled (e.g., corresponding to a new TB) if and when the grant is for unicast/broadcast and the stored TB is for broadcast/unicast. In some aspects, the HARQ process identifier relationship may be one of direct or indirect. A direct relationship may correspond to the case where HARQ process identifier for broadcast overrides the same HARQ process identifier for unicast. An indirect relationship may correspond to the case where HARQ process identifier for broadcast overrides a different HARQ process identifier for unicast (i.e., translation function may be signaled to UE and specified).

In a further implementation, unicast retransmissions may be supported following initial multicast transmissions (e.g., second mode). In such implementation, an association of multicast HARQ processes with unicast HARQ processes may be made. In one aspect, a unicast grant may be received with a cell radio network temporary identifier (C-RNTI), including an association between the unicast HARQ process and multicast HARQ process. For example, if the UE 104 is configured with M=3 HARQ processes for unicast, and N=2 HARQ processes for multicast, the first M−N=1 may be dedicated to unicast, and the remaining N can be used for multicast retransmissions. In another example, broadcast HARQ processes {0,1} may correspond to unicast HARQ processes {10, 11} in one UE and {7, 8} in a different UE.

Further, when the UE 104 receives a unicast HARQ retransmission after initial broadcast/multicast transmission, the UE 104 may combine log likelihood ratios (LLRs) before attempting the decoding. At the UE 104, if a new grant is received, the communicating component 242 may clear a buffer and consider a NDI to be toggled (e.g., corresponding to a new TB) if and when the grant is for multicast/broadcast and the stored TB is for unicast. In such case, the TB mode may correspond to multicast/broadcast. On the other hand, if a new grant is received, the communicating component 242 may combine data if and when the grant is for unicast and the stored TB is for broadcast. In such case, the TB mode may correspond to unicast.

In another aspect, a unicast grant may be received with a third RNTI (e.g. retransmission radio network temporary identifier (RETX-RNTI)) which may indicate that the retransmission is a unicast retransmission associated with a multicast DCI. In some aspects, the same HARQ process may be reused.

In an additional aspect, retransmissions may be performed with group RNTI (G-RNTI), but the DCI may be mapped onto the UE-specific search space (USS) (e.g., instead of common search space). Size would follow USS. The HARQ/NDI may be shared with the G-RNTI CSS DCI. In this case, by base station 102 implementation, the PDCCH can be unicast (e.g., sent in USS) but multiple PDCCH for different UEs may point to the same PDSCH.

In another aspect, a number of benefits of switching to unicast compared to multicast may exist. For instance, UE-specific CSI feedback may be utilized to optimize transmission for a particular UE. Further, UE-specific configuration (more flexibility in DCI) may be utilized. In an example operating within frequency range 1, there may be two UEs 104 with NACK'ed transmissions. The base station 102 may be configured to use UE-specific transmission to transmit using PRB 0-10 to UE1 (e.g., using precoding/CSI optimized for a first UE) and transmit using PRB 50-60 to UE2 (e.g., using precoding/CSI optimized for a second UE).

In the baseline setting, UEX may receive the transmission for UEX, but the performance may be better if the first UE also receives the transmission for the second UE.

Hence, for multiple G-RNTI transmissions in one transmit time interval (TTI), a UE 104 may select which one to decode. That is, there may be multiple DCIs associated with the same G-RNTI (or with C-RNTI), but not multiple G-RNTI. The UE may determine which PDSCH to decode (e.g., based on a determined DMRS signal-to-noise ratio (SNR)). In a further aspect, since a low density parity check (LDPC) decoding quantity may not increase, a UE capability may be added to enable decoding of multiple DCIs associated with the same TB. For instance, the DCIs may all be G-RNTI, or mix of G-RNTI/C-RNTI. Another implementation may allow for a single DCI with more than two clusters (e.g., optimized for greater than two UEs) and with separate parameters (e.g., potentially modulation and coding scheme (MCS)/code rate matching may be performed separately).

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 132, 134 and/or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Turning now to FIGS. 2-7, aspects are depicted with reference to one or more components and one or more methods that may perform the actions or operations described herein, where aspects in dashed line may be optional. Although the operations described below in FIGS. 4-7 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
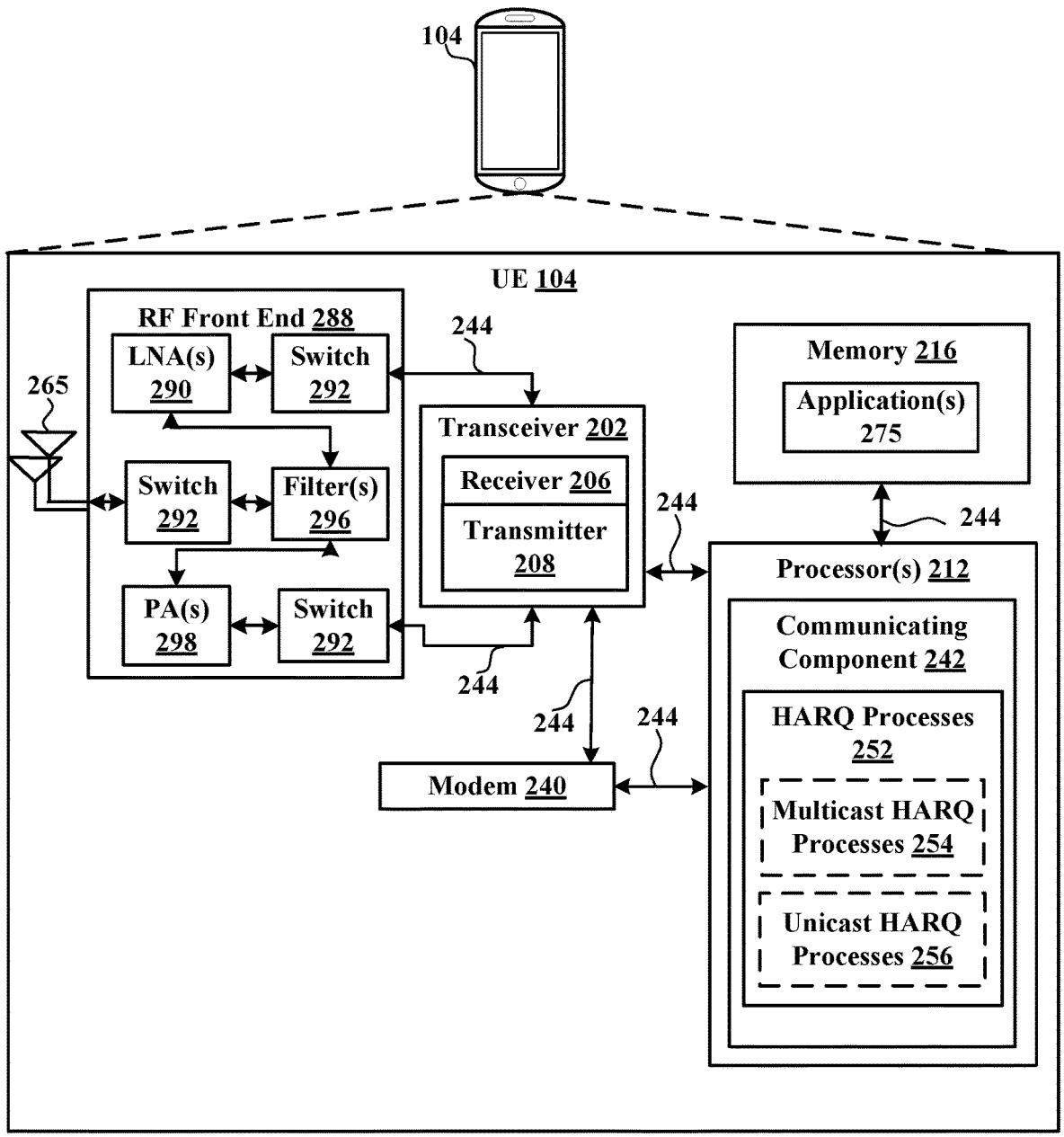
FIG. 2 is a block diagram illustrating an example of a user equipment (UE), in accordance with various aspects of the present disclosure.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for performing one or more HARQ processes 252 associated with multicast and/or unicast data transmissions. In some aspects, the one or more HARQ processes may include one or more multicast HARQ processes 254 and/or one or more unicast HARQ processes 256.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, SNR, reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, and/or antenna arrays.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 212 may correspond to one or more of the processors described in connection with the UE in FIG. 8. Similarly, the memory 216 may correspond to the memory described in connection with the UE in FIG. 8.

Figure 3:
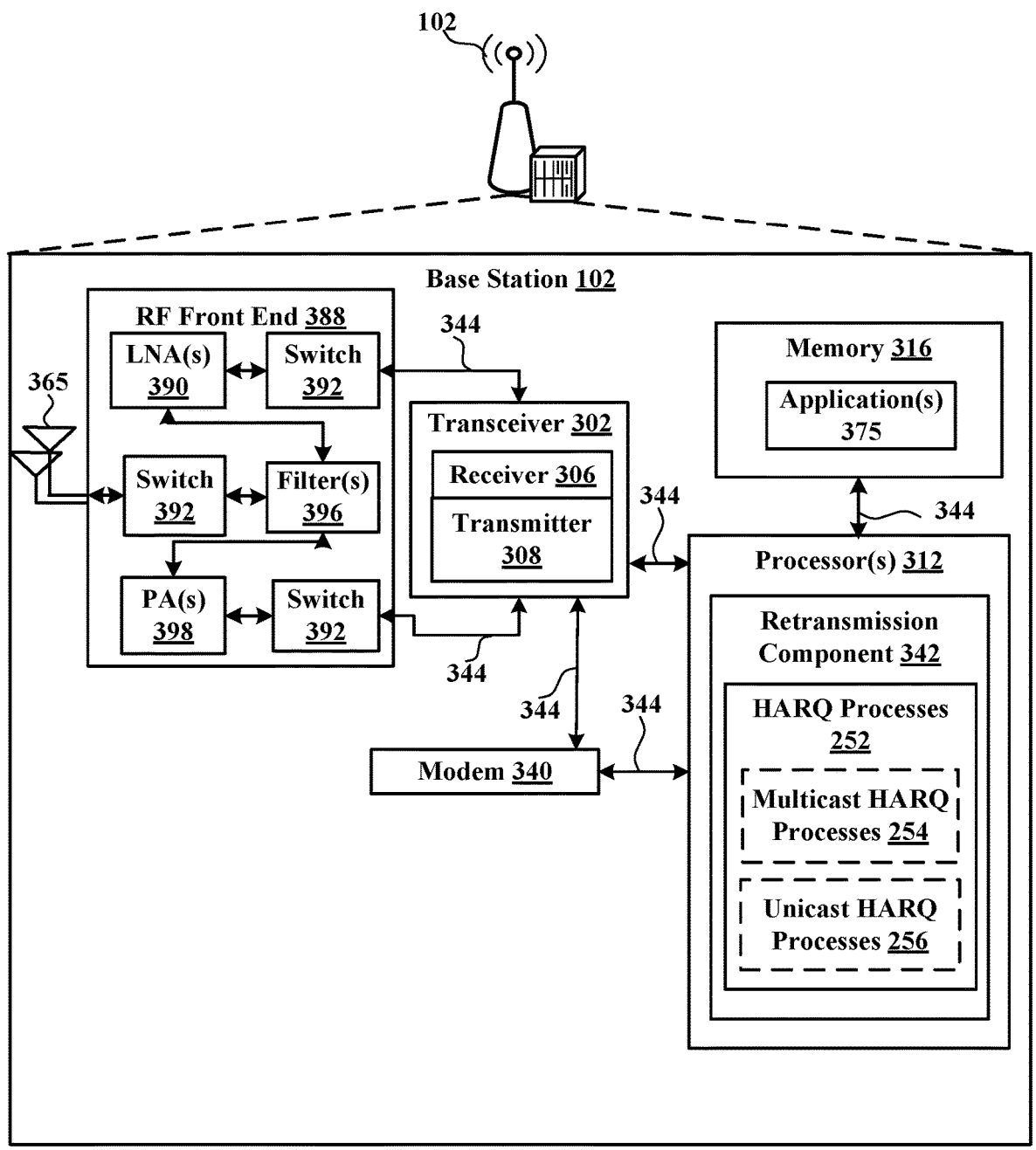
FIG. 3 is a block diagram illustrating an example of a network entity (also referred to as a base station), in accordance with various aspects of the present disclosure.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and retransmission component 342 for facilitating retransmissions according to one or more HARQ processes 252 via multicast and/or unicast data transmissions. In some aspects, the one or more HARQ processes may include one or more multicast HARQ processes 254 and/or one or more unicast HARQ processes 256.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, the processor(s) 312 may correspond to one or more of the processors described in connection with the base station in FIG. 8. Similarly, the memory 316 may correspond to the memory described in connection with the base station in FIG. 8.

Figure 4:
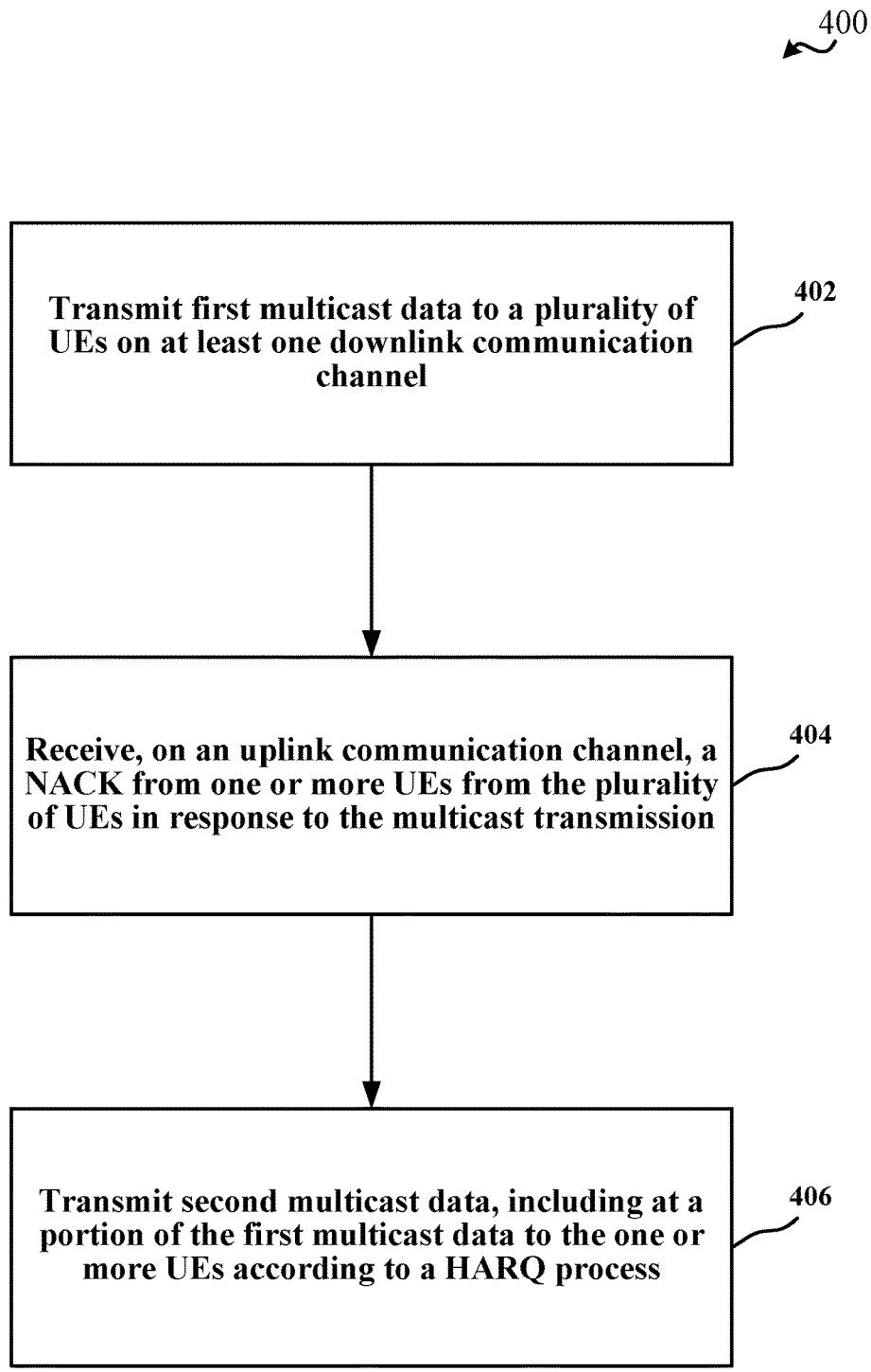
FIG. 4 is a flow chart illustrating an example of a method for wireless communications at a UE including an initial multicast reception and second multicast reception of a multicast retransmission, in accordance with various aspects of the present disclosure.

FIG. 4 illustrates a flow chart of an example of a method 400 for wireless communication at a network entity. In an example, a base station 102 can perform the functions described in method 400 using one or more of the components described in FIGS. 1 and 3.

At block 402, the method 400 may transmit first multicast data to a plurality of UEs on at least one downlink communication channel. In an aspect, the retransmission component 342, e.g., in conjunction with processor(s) 312, memory 316, and/or transceiver 302, may be configured to transmit first multicast data to a plurality of UEs 104 on at least one downlink communication channel. Thus, the network entity 102, the processor(s) 312, the determining component 342 or one of its subcomponents may define the means for transmitting first multicast data to a plurality of UEs on at least one downlink communication channel.

At block 404, the method 400 may receive, on an uplink communication channel, a NACK from one or more UEs from the plurality of UEs in response to the multicast data transmission. In an aspect, the retransmission component 342, e.g., in conjunction with processor(s) 312, memory 316, and/or transceiver 302, may be configured to receive, on an uplink communication channel, a NACK from one or more UEs 104 from the plurality of UEs in response to the multicast transmission. Thus, the network entity 102, the processor(s) 312, the determining component 342 or one of its subcomponents may define the means for receiving, on an uplink communication channel, a NACK from one or more UEs from the plurality of UEs in response to the multicast transmission.

At block 406, the method 400 may transmit second multicast data, including at a portion of the first multicast data to the one or more UEs according to a HARQ process. In an aspect, the retransmission component 342, e.g., in conjunction with processor(s) 312, memory 316, and/or transceiver 302, may be configured to transmit second multicast data, including at a portion of the first multicast data to the one or more UEs 104 according to a HARQ process. Thus, the network entity 102, the processor(s) 312, the determining component 342 or one of its subcomponents may define the means for transmitting second multicast data, including at a portion of the first multicast data to the one or more UEs according to a HARQ process.

In some aspects, the plurality of UEs 104 may be associated with a common G-RNTI.

Although not shown, in some aspects, the method 400 may include configuring a number of HARQ processes for multicast data transmission (e.g., multicast HARQ processes 254) for each of the plurality of UEs, wherein the number of HARQ processes for multicast data transmission may be common across each UE of the plurality of UEs 104.

Although not shown, in some aspects, the method 400 may include determining a total number of HARQ processes 252 including the number of HARQ processes for multicast data transmission (e.g., multicast HARQ processes 254) and a number of HARQ processes for unicast data transmission (e.g., unicast HARQ processes 256), and transmitting the total number of HARQ processes 252 to at least one of the plurality of UEs 104.

In some aspects, the total number of HARQ processes 252 may correspond to a HARQ threshold value limiting the number of configured HARQ processes.

Although not shown, in some aspects, the method 400 may include determining a number of HARQ processes for unicast data transmission (e.g., unicast HARQ processes 256), where configuring the number of HARQ processes for multicast data transmission (e.g., multicast HARQ processes 254) for each of the plurality of UEs 104 may include allocating the number of HARQ processes for multicast data transmission (e.g., multicast HARQ processes 254) from the number of HARQ processes (e.g., HARQ processes 252), and transmitting the number of HARQ processes for unicast data transmission (e.g., unicast HARQ processes 256) and the number of HARQ processes for multicast data transmission (e.g., multicast HARQ processes 254) to one or more of the plurality of UEs 104.

In some aspects, transmitting the second multicast data to the one or more UEs 104 according to the HARQ process may include determining that at least one HARQ process for unicast data transmission (e.g., from the unicast HARQ processes 256) is available, and associating the at least one HARQ process from the unicast data transmission to the second multicast data transmission.

Although not shown, in some aspects, the method 400 may include configuring a NDI based on associating the at least one HARQ process from the unicast data transmission (e.g., unicast HARQ processes 256) to the second multicast data transmission.

Although not shown, in some aspects, the method 400 may include transmitting at least one of the NDI for the at least one HARQ process associated with the second multicast data transmission, a grant for the at least one HARQ process associated with the second multicast data transmission, or a HARQ process override identifier for the at least one HARQ process associated with the second multicast data transmission.

Figure 5:
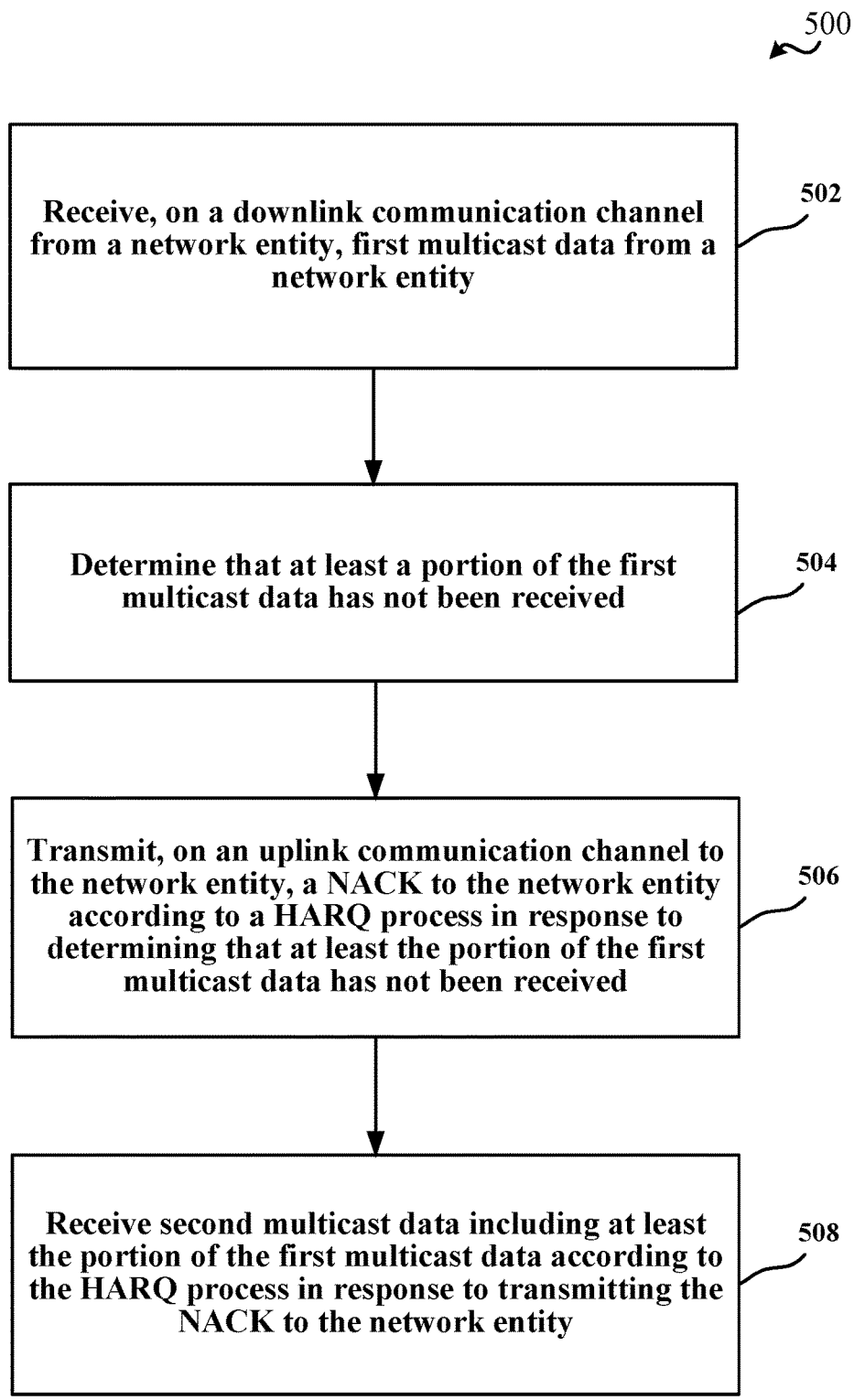
FIG. 5 is a flow chart illustrating an example of a method for wireless communications including a multicast transmission and multicast retransmission at a network entity, in accordance with various aspects of the present disclosure.

FIG. 5 illustrates a flow chart of an example of a method 500 for wireless communications at a UE. In one example, a UE 104 can perform the functions described in method 500 using one or more of the components described in FIGS. 1 and 2.

At block 502, the method 500 may receive, on a downlink communication channel from a network entity, first multicast data from a network entity. In an aspect, the communicating component 242, e.g., in conjunction with processor(s) 212, memory 216, and/or transceiver 202, may be configured to receive, on a downlink communication channel from a network entity, first multicast data from a network entity (e.g., base station 102). Thus, the UE 104, the processor(s) 212, transceiver 202, the communicating component 242 or one of its subcomponents may define the means for receiving, on a downlink communication channel from a network entity, first multicast data from a network entity.

At block 504, the method 500 may determine that at least a portion of the first multicast data has not been received. In an aspect, the communicating component 242, e.g., in conjunction with processor(s) 212, memory 216, and/or transceiver 202, may be configured to determine that at least a portion of the first multicast data has not been received. Thus, the UE 104, the processor(s) 212, the communicating component 242 or one of its subcomponents may define the means for determining that at least a portion of the first multicast data has not been received.

At block 506, the method 500 may transmit, on an uplink communication channel to the network entity, a NACK to the network entity according to a HARQ process in response to determining that at least the portion of the first multicast data has not been received. In an aspect, the communicating component 242, e.g., in conjunction with processor(s) 212, memory 216, and/or transceiver 202, may be configured to transmit, on an uplink communication channel to the network entity, a NACK to the network entity according to a HARQ process in response to determining that at least the portion of the first multicast data has not been received. Thus, the UE 104, the processor(s) 212, transceiver 202, the communicating component 242 or one of its subcomponents may define the means for transmitting, on an uplink communication channel to the network entity, a NACK to the network entity according to a HARQ process in response to determining that at least the portion of the first multicast data has not been received.

At block 508, the method 500 may receive second multicast data including at least the portion of the first multicast data according to the HARQ process in response to transmitting the NACK to the network entity. In an aspect, the communicating component 242, e.g., in conjunction with processor(s) 212, memory 216, and/or transceiver 202, may be configured to receive second multicast data including at least the portion of the first multicast data according to the HARQ process in response to transmitting the NACK to the network entity. Thus, the UE 104, the processor(s) 212, transceiver 202, the communicating component 242 or one of its subcomponents may define the means for receiving second multicast data including at least the portion of the first multicast data according to the HARQ process in response to transmitting the NACK to the network entity.

Although not shown, in some aspects, the method 500 may include receiving a number of HARQ processes permitted for multicast data transmission from the network entity.

Although not shown, in some aspects, the method 500 may include receiving configuration of a number of HARQ processes for unicast (e.g., unicast HARQ processes 256) and a number of HARQ processes for multicast data transmission (e.g., multicast HARQ processes 256), where the number of HARQ processes for unicast data transmission plus the number of HARQ processes for multicast data transmission does not satisfy (e.g., is below) a threshold (e.g., HARQ processes 252 is below a threshold HARQ value).

Although not shown, in some aspects, the method 500 may include receiving a number of HARQ processes for unicast data transmission (e.g., unicast HARQ processes 256) including an allocation of the number of HARQ processes for multicast data transmission (e.g., multicast HARQ processes 254) from the number of HARQ processes for unicast data transmission.

In some aspects, the HARQ process may correspond to one of the allocated number of HARQ processes for multicast data transmission from the number of HARQ processes for unicast data transmission.

In some aspects, receiving the second multicast data of at least the portion of the data may include receiving the second multicast data according to the HARQ process previously associated with a unicast data transmission.

Although not shown, in some aspects, the method 500 may include receiving at least one of a NDI for the HARQ process associated with the second multicast data, a grant for the HARQ process associated with the second multicast data transmission, or a HARQ process override identifier for the HARQ process associated with the second multicast data transmission.

In some aspects, reception of the grant may trigger clearing of a storage buffer and an indication of a toggling of the NDI.

In some aspects, the HARQ process identifier may indicate that the HARQ process for multicast data transmission overrides the HARQ process for unicast data transmission.

Figure 6:
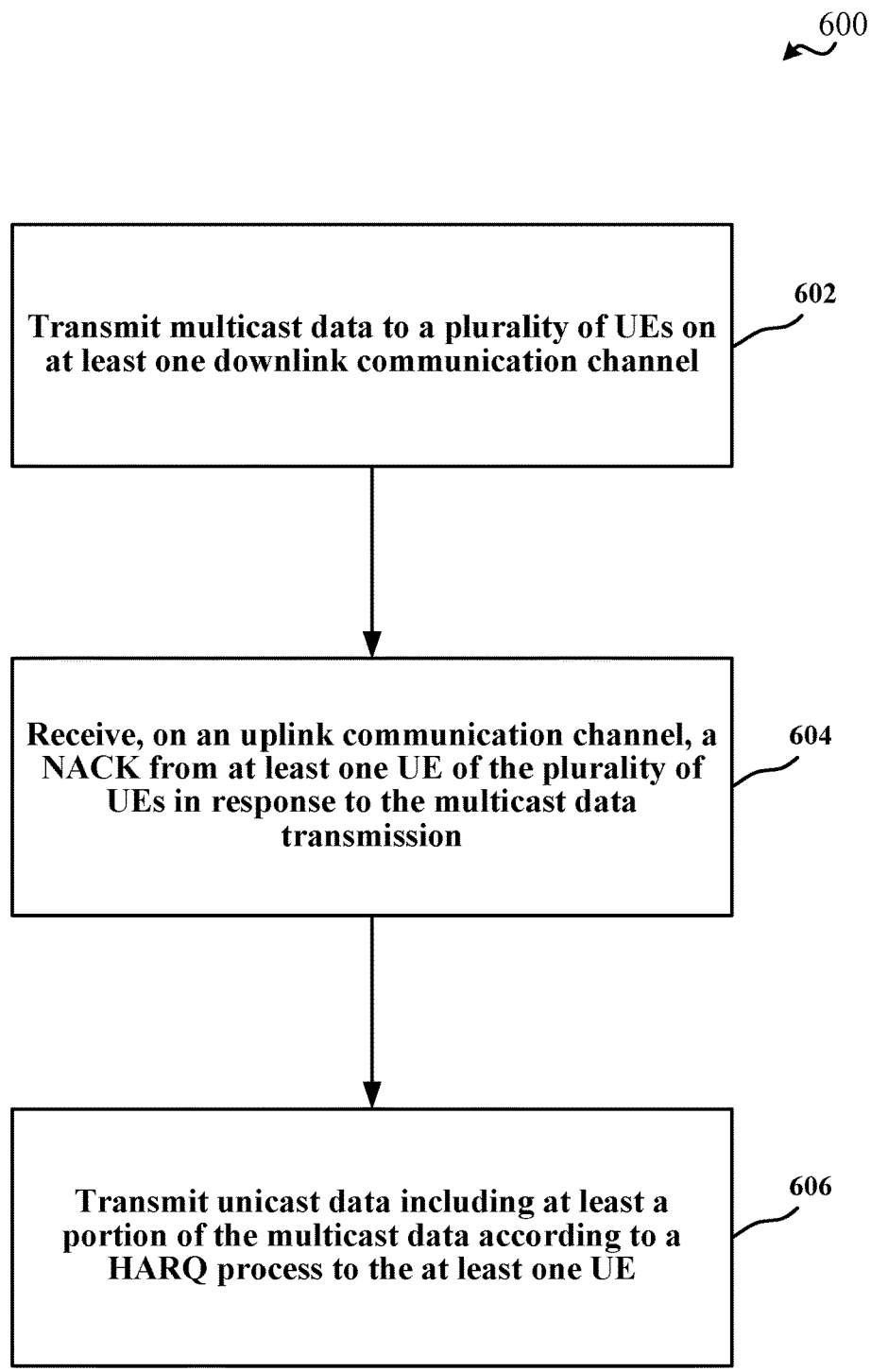
FIG. 6 is a flow chart illustrating an example of a method for wireless communications at a UE including a multicast reception and a unicast reception, in accordance with various aspects of the present disclosure.

FIG. 6 illustrates a flow chart of an example of a method 600 for wireless communication at a network entity. In an example, a base station 102 can perform the functions described in method 600 using one or more of the components described in FIGS. 1 and 3.

At block 602, the method 600 may transmit multicast data to a plurality of UEs on at least one downlink communication channel. In an aspect, the retransmission component 342, e.g., in conjunction with processor(s) 312, memory 316, and/or transceiver 302, may be configured to transmit multicast data to a plurality of UEs 104 on at least one downlink communication channel. Thus, the network entity 102, the processor(s) 312, the transceiver 302, the determining component 342 or one of its subcomponents may define the means for transmitting multicast data to a plurality of UEs on at least one downlink communication channel.

At block 604, the method 600 may receive, on an uplink communication channel, a NACK from one or more UEs from the plurality of UEs in response to the multicast data transmission. In an aspect, the retransmission component 342, e.g., in conjunction with processor(s) 312, memory 316, and/or transceiver 302, may be configured to receive, on an uplink communication channel, a NACK from one or more UEs 104 from the plurality of UEs in response to the multicast data transmission. Thus, the network entity 102, the transceiver 302, the processor(s) 312, the determining component 342 or one of its subcomponents may define the means for receiving, on an uplink communication channel, a NACK from one or more UEs from the plurality of UEs in response to the multicast data transmission.

At block 606, the method 600 may transmit unicast data, including at a portion of the data to the one or more UEs according to a HARQ process to the at least one UE. In an aspect, the retransmission component 342, e.g., in conjunction with processor(s) 312, memory 316, and/or transceiver 302, may be configured to transmit unicast data, including at a portion of the data to the one or more UEs 104 according to a HARQ process to the at least one UE. Thus, the network entity 102, the processor(s) 312, the transceiver 302, the determining component 342 or one of its subcomponents may define the means for transmitting unicast data, including at a portion of the multicast data to the one or more UEs according to a HARQ process to the at least one UE.

Although not shown, in some aspects, the method 600 may include transmitting a grant associated with a C-RNTI indicating a HARQ process identifier for unicast data transmission including the HARQ process, where the HARQ process identifier for unicast data transmission is associated with at least one HARQ process for multicast data transmission.

In some aspects, a subset of the number of HARQ processes for unicast data transmission (e.g., unicast HARQ processes 256) may be allocated for the multicast data transmission.

Although not shown, in some aspects, the method 600 may include transmitting a grant associated with a RETX-RNTI indicating the unicast data transmission is associated with DCI of the multicast data transmission.

Although not shown, in some aspects, the method 600 may include transmitting a grant for the unicast data transmission based on a G-RNTI and DCI mapped to a UE-specific search space.

In some aspects, receiving the NACK from the at least one UE may include receiving a first NACK from a first UE and a second NACK from a second UE, the method 600 may further include transmit a plurality of grants to the first UE and the second UE within a single TTI, where retransmitting at least the portion of the data includes retransmitting to the first UE according to the HARQ process via unicast data transmission and the second UE according to a second HARQ process via unicast data transmission.

In some aspects, receiving the NACK from the at least one UE may include receiving a first NACK from a first UE and a second NACK from a second UE, the method further including transmitting a grant to the first UE and the second UE within a second TTI, where the grant indicates a resource allocation with a plurality of clusters, wherein at least one of MCS determination, TBS determination, or rate matching is performed independently for each of the plurality of clusters.

Figure 7:
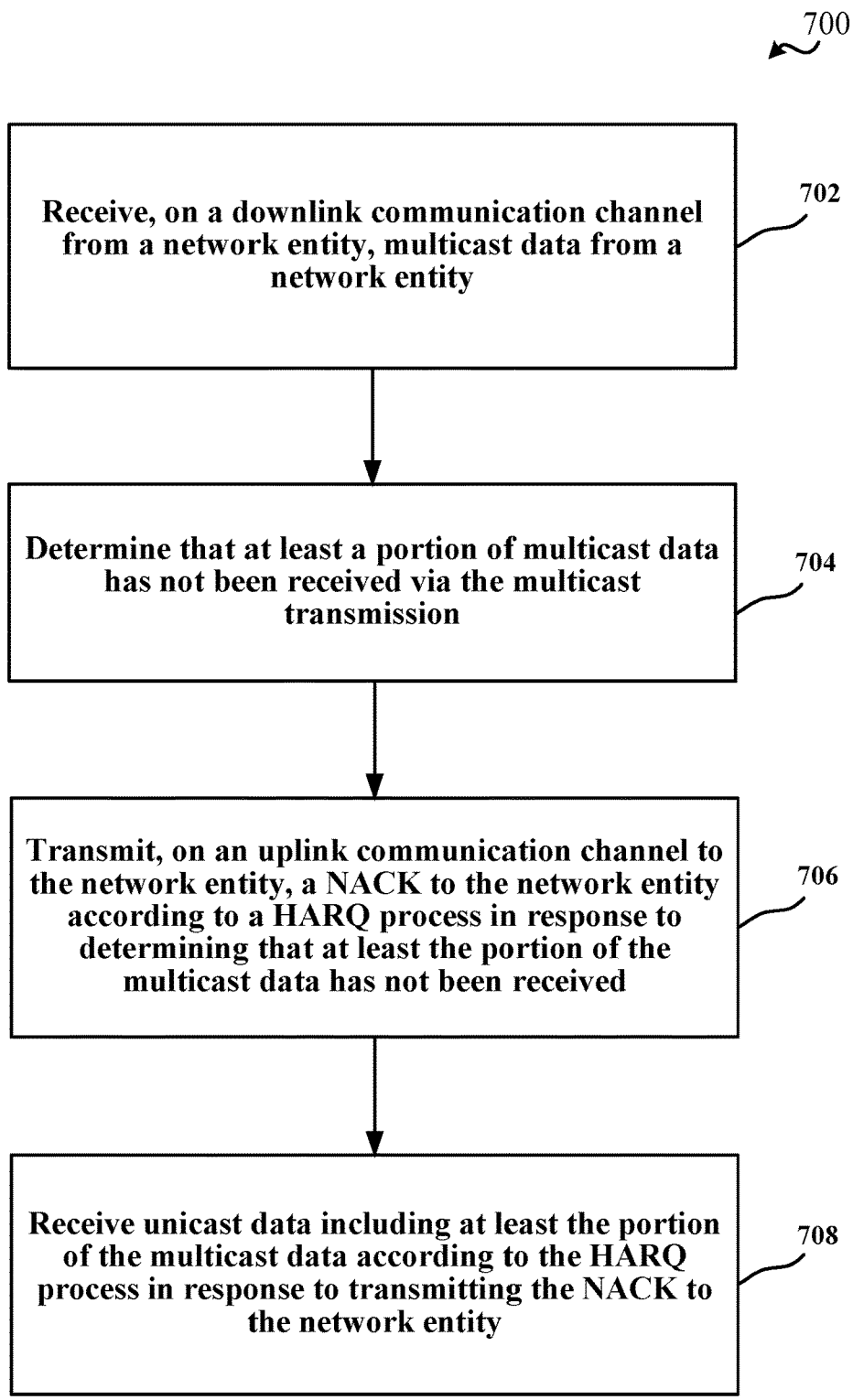
FIG. 7 is a flow chart illustrating an example of a method for wireless communications at a network entity including a multicast transmission and a multicast retransmission, in accordance with various aspects of the present disclosure.

FIG. 7 illustrates a flow chart of an example of a method 700 for wireless communications at a UE. In one example, a UE 104 can perform the functions described in method 700 using one or more of the components described in FIGS. 1 and 2.

At block 702, the method 700 may receive, on a downlink communication channel from a network entity, first multicast data from a network entity. In an aspect, the communicating component 242, e.g., in conjunction with processor (s) 212, memory 216, and/or transceiver 202, may be configured to receive, on a downlink communication channel from a network entity, first multicast data from a network entity (e.g., base station 102). Thus, the UE 104, the processor(s) 212, transceiver 202, the communicating component 242 or one of its subcomponents may define the means for receiving, on a downlink communication channel from a network entity, first multicast data from a network entity.

At block 704, the method 700 may determine that at least a portion of the multicast data has not been received via multicast data transmission. In an aspect, the communicating component 242, e.g., in conjunction with processor(s) 212, memory 216, and/or transceiver 202, may be configured to determine that at least a portion of the multicast data has not been received via multicast data transmission. Thus, the UE 104, the processor(s) 212, transceiver 202, the communicating component 242 or one of its subcomponents may define the means for determining that at least a portion of the multicast data has not been received via multicast data transmission.

At block 706, the method 700 may transmit, on an uplink communication channel to the network entity, a NACK to the network entity according to a HARQ process in response to determining that at least the multicast portion has not been received. In an aspect, the communicating component 242, e.g., in conjunction with processor(s) 212, memory 216, and/or transceiver 202, may be configured to transmit, on an uplink communication channel to the network entity, a NACK to the network entity according to a HARQ process in response to determining that at least the portion of the multicast data has not been received. Thus, the UE 104, the processor(s) 212, transceiver 202, the communicating component 242 or one of its subcomponents may define the means for transmitting, on an uplink communication channel to the network entity, a NACK to the network entity according to a HARQ process in response to determining that at least the portion of the multicast data has not been received.

At block 708, the method 700 may receive unicast data including at least the portion of the multicast data according to the HARQ process and in response to transmitting the NACK to the network entity. In an aspect, the communicating component 242, e.g., in conjunction with processor(s) 212, memory 216, and/or transceiver 202, may be configured to receive unicast data including at least the portion of the multicast data according to the HARQ process and in response to transmitting the NACK to the network entity. Thus, the UE 104, the processor(s) 212, transceiver 202, the communicating component 242 or one of its subcomponents may define the means for receiving unicast data including at least the portion of the multicast data according to the HARQ process and in response to transmitting the NACK to the network entity.

Although not shown, in some aspects, the method 700 may include receiving a grant associated with a C-RNTI indicating a HARQ process identifier for unicast data transmission including the HARQ process, wherein the HARQ process identifier for unicast data transmission is associated with at least one HARQ process for multicast data transmission.

In some aspects, a subset of the number of HARQ processes for unicast data transmission is allocated for the multicast data transmission.

In some aspects, the multicast data transmission is associated with a first LLR and the unicast data retransmission is associated with a second LLR, the method 700 further including combining the first LLR and the second LLR in response to receiving the unicast data including at least the portion of the data.

Although not shown, in some aspects, the method 700 receiving a grant associated with a RETX-RNTI indicating the unicast data retransmission is associated with DCI of the multicast data transmission.

Although not shown, in some aspects, the method 700 may include receiving a grant for the unicast data retransmission based on a G-RNT and DCI mapped to a UE-specific search space.

Although not shown, in some aspects, the method 700 receiving a plurality of grants within a single TTI, and determining a grant associated with a G-RNTI of the UE from the grants within the TTI based at least on one of a DMRS SNR, a UE capability indication within DCI, or DCI for a UE cluster including the UE, and where receiving the unicast retransmission includes receiving the unicast data transmission of at least the portion of the data according to the HARQ process based on determining the grant associated with the G-RNTI of the UE.

Figure 8:
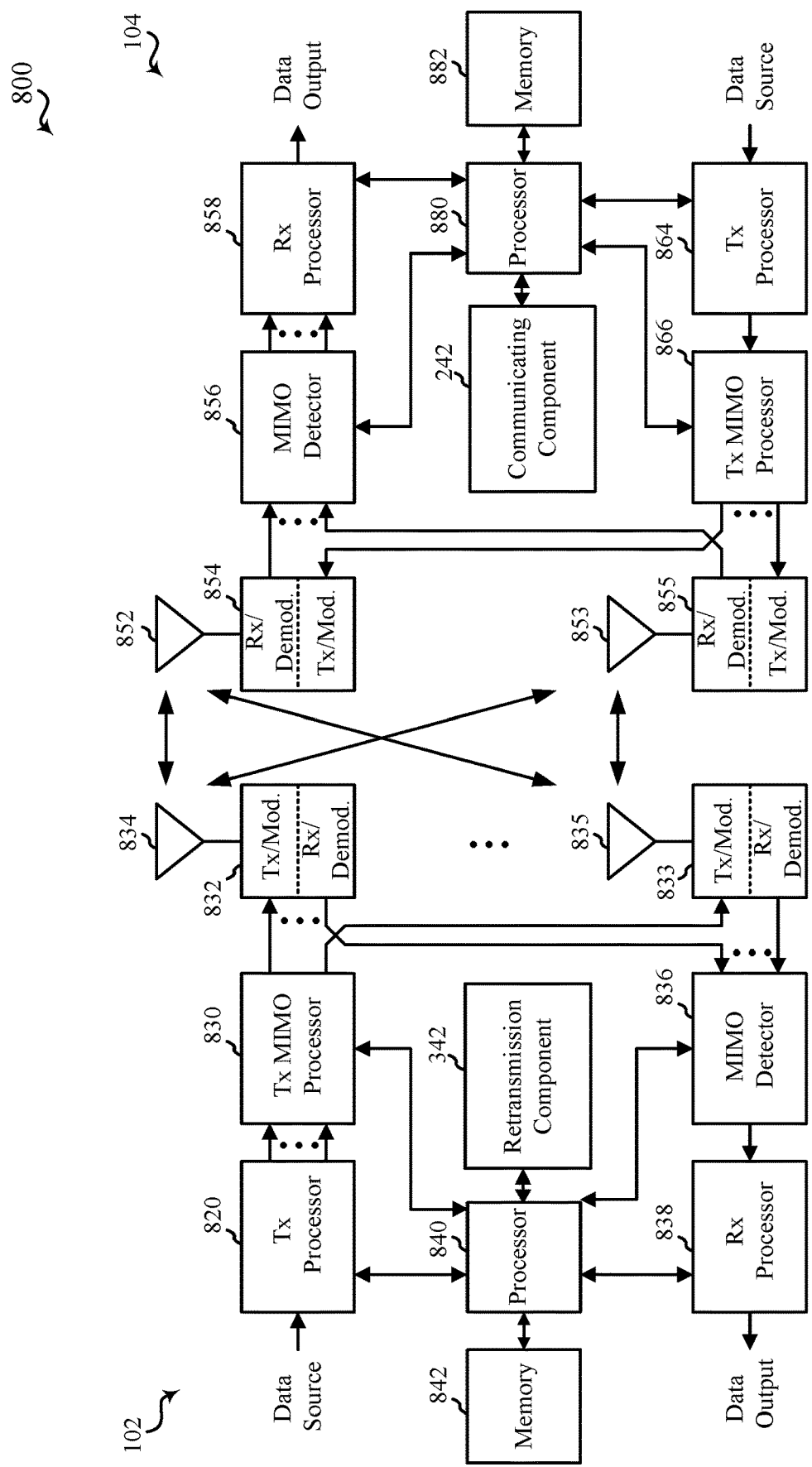
FIG. 8 is a block diagram illustrating an example of a MIMO communication system including a base station and a UE, in accordance with various aspects of the present disclosure.

FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1 and 2. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a communicating component 242 (see e.g., FIGS. 1 and 2).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 may in some cases execute stored instructions to instantiate a retransmission component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 800.

SOME FURTHER EXAMPLES

In one example, a method of communications at a network entity comprises transmitting first multicast data a plurality of UEs on at least one downlink communication channel, receiving, on an uplink communication channel, a NACK from one or more UEs from the plurality of UEs in response to the first multicast data transmission, and transmitting second multicast data including at least a portion of the data to the one or more UEs according to a HARQ process.

One or more of the above examples can further include wherein the plurality of UEs are associated with a common G-RNTI.

One or more of the above examples can further include configuring a number of HARQ processes for multicast data transmission for each of the plurality of UEs, wherein the number of HARQ processes is common across each UE of the plurality of UEs.

One or more of the above examples can further include further comprising determining a total number of HARQ processes including the number of HARQ processes for multicast data transmission and a number of HARQ processes for unicast data transmission, and transmitting the total number of HARQ processes to at least one of the plurality of UEs.

One or more of the above examples can further include wherein the total number of HARQ processes corresponds to a HARQ threshold value limiting the number of configured HARQ processes.

One or more of the above examples can further include determining a number of HARQ processes for unicast data transmission, wherein configuring the number of HARQ processes for multicast data transmission for each of the plurality of UEs includes allocating the number of HARQ processes for multicast data transmission from the number of HARQ processes, and transmitting the number of HARQ processes for unicast data transmission and the number of HARQ processes for multicast data transmission to one or more of the plurality of UEs.

One or more of the above examples can further include wherein transmitting the second multicast data to the one or more UEs according to the HARQ process includes determining that at least one HARQ process for unicast data transmission is available, and associating the at least one HARQ process from the unicast data transmission to the second multicast data transmission.

One or more of the above examples can further include configuring a NDI based on associating the at least one HARQ process from the unicast data transmission to the second multicast data transmission.

One or more of the above examples can further include transmitting at least one of the NDI for the at least one HARQ process associated with the second multicast data transmission, a grant for the at least one HARQ process associated with the second multicast data transmission, or a HARQ process override identifier for the at least one HARQ process associated with the second multicast data transmission.

In another example, a method of communications at a UE comprises receiving, on a downlink communication channel from a network entity, first multicast data from a network entity, determining that at least a portion of data from the first multicast data has not been received, transmitting, on an uplink communication channel to the network entity, a NACK to the network entity according to a HARQ process and in response to determining that at least the portion of the data has not been received, and receiving second multicast data including at least the portion of the data according to the HARQ process and in response to transmitting the NACK to the network entity.

One or more of the above examples can further include receiving a number of HARQ processes permitted for multicast data transmission from the network entity.

One or more of the above examples can further include receiving configuration of a number of HARQ processes for unicast and a number of HARQ processes for multicast data transmission, wherein the number of HARQ processes for unicast data transmission plus the number of HARQ processes for multicast data transmission is below a threshold.

One or more of the above examples can further include receiving a number of HARQ processes for unicast data transmission including an allocation of the number of HARQ processes for multicast data transmission from the number of HARQ processes for unicast data transmission.

One or more of the above examples can further include wherein the HARQ process corresponds to one of the allocated number of HARQ processes for multicast data transmission from the number of HARQ processes for unicast data transmission.

One or more of the above examples can further include wherein receiving the second multicast data of at least the portion of the data includes receiving the second multicast data according to the HARQ process previously associated with a unicast data transmission.

One or more of the above examples can further include receiving at least one of a NDI for the HARQ process associated with the second multicast data a grant for the HARQ process associated with the second multicast data transmission, or a HARQ process override identifier for the HARQ process associated with the second multicast data transmission.

One or more of the above examples can further include wherein reception of the grant triggers clearing of a storage buffer and an indication of a toggling of the NDI.

One or more of the above examples can further include wherein the HARQ process identifier indicates that the HARQ process for multicast data transmission overrides the HARQ process for unicast data transmission.

In an additional example, a method of communications at a network entity, comprises transmitting multicast data to a plurality of UEs on at least one downlink communication channel, receiving, on an uplink communication channel, a NACK from at least one UE of the plurality of UEs in response to the multicast data transmission, and transmitting unicast data including at least a portion of the data according to a HARQ process to the at least one UE.

One or more of the above examples can further include transmitting a grant associated with a C-RNTI indicating a HARQ process identifier for unicast data transmission including the HARQ process, wherein the HARQ process identifier for unicast data transmission is associated with at least one HARQ process for multicast data transmission.

One or more of the above examples can further include wherein a subset of the number of HARQ processes for unicast data transmission is allocated for the multicast data transmission.

One or more of the above examples can further include transmitting a grant associated with a RETX-RNTI indicating the unicast data transmission is associated with DCI of the multicast data transmission.

One or more of the above examples can further include transmitting a grant for the unicast data transmission based on a G-RNTI and DCI mapped to a UE-specific search space.

One or more of the above examples can further include wherein receiving the NACK from the at least one UE includes receiving a first NACK from a first UE and a second NACK from a second UE, the method further comprising transmitting a plurality of grants to the first UE and the second UE within a single TTI, wherein retransmitting at least the portion of the data includes retransmitting to the first UE according to the HARQ process via unicast data transmission and the second UE according to a second HARQ process via unicast data transmission.

One or more of the above examples can further include wherein receiving the NACK from the at least one UE includes receiving a first NACK from a first UE and a second NACK from a second UE, the method further comprising transmitting a grant to the first UE and the second UE within a second TTI, wherein the grant indicates a resource allocation with a plurality of clusters, wherein at least one of MCS determination, TBS determination, or rate matching is performed independently for each of the plurality of clusters.

In yet another example, a method of communications at a UE comprises receiving, on a downlink communication channel from a network entity, multicast data from a network entity, determining that at least a portion of the data from the multicast data has not been received via the multicast data transmission, transmitting, on an uplink communication channel to the network entity, a NACK to the network entity according to a HARQ process and in response to determining that at least the portion of the data has not been received, and receiving unicast data including at least the portion of the data according to the HARQ process and in response to transmitting the NACK to the network entity.

One or more of the above examples can further include receiving a grant associated with a C-RNTI indicating a HARQ process identifier for unicast data transmission including the HARQ process, wherein the HARQ process identifier for unicast data transmission is associated with at least one HARQ process for multicast data transmission.

One or more of the above examples can further include wherein a subset of the number of HARQ processes for unicast data transmission is allocated for the multicast data transmission.

One or more of the above examples can further include wherein the multicast data transmission is associated with a first LLR and the unicast data retransmission is associated with a second LLR, the method further comprising combining the first LLR and the second LLR in response to receiving the unicast data including at least the portion of the data.

One or more of the above examples can further include receiving a grant associated with a RETX-RNTI indicating the unicast data retransmission is associated with DCI of the multicast data transmission.

One or more of the above examples can further include receiving a grant for the unicast data retransmission based on a G-RNTI and DCI mapped to a UE-specific search space.

One or more of the above examples can further include receiving a plurality of grants within a single TTI, and determining a grant associated with a G-RNTI of the UE from the grants within the TTI based at least on one of a DMRS SNR, a UE capability indication within DCI, or DCI for a UE cluster including the UE, and wherein receiving the unicast data retransmission includes receiving the unicast transmission of at least the portion of the data according to the HARQ process based on determining the grant associated with the G-RNTI of the UE.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of communications at a network entity, comprising:
    transmitting, on a downlink communication channel for a user equipment (UE) and based at least in part on a first identifier associated with the UE, a multicast data transmission comprising first multicast data;
    receiving, on an uplink communication channel for the UE, a negative acknowledgment (NACK) according to a first hybrid automatic repeat request (HARQ) process indicating that at least a portion of the first multicast data has not been received; and
    transmitting, on the downlink communication channel or another downlink communication channel for the UE and based at least in part on a second identifier associated with the UE that is different from the first identifier, a unicast data transmission comprising unicast data, the unicast data transmission using a HARQ process identifier associated with the first HARQ process and different from the first identifier and the second identifier, wherein the unicast data includes at least the portion of the first multicast data.

2. The method of claim 1, further comprising selecting the first HARQ process from one or more HARQ processes available for feedback for unicast data transmission, and associating the first HARQ process with at least the portion of the first multicast data.

3. The method of claim 1, further comprising configuring, for the UE, a number of HARQ processes permitted for feedback for multicast data transmission from the network entity.

4. The method of claim 1, further comprising configuring, for each of multiple UEs including the UE, a number of HARQ processes permitted for feedback for multicast data transmission from the network entity, wherein the number of HARQ processes is common across the multiple UEs.

5. The method of claim 1, further comprising configuring, for the UE, a number of HARQ processes for feedback for unicast data transmission and a number of HARQ processes for feedback for multicast data transmission, wherein the number of HARQ processes for unicast data transmission plus the number of HARQ processes for multicast data transmission is below a threshold.

6. The method of claim 1, further comprising configuring, for the UE, a number of HARQ processes for feedback for unicast data transmission including an allocated number of HARQ processes for feedback for multicast data transmission from the number of HARQ processes for feedback for unicast data transmission.

7. The method of claim 6, wherein the first HARQ process corresponds to one of the allocated number of HARQ processes for feedback for multicast data transmission from the number of HARQ processes for feedback for unicast data transmission.

8. The method of claim 1, wherein transmitting the unicast data that includes at least the portion of the first multicast data includes transmitting the unicast data according to the first HARQ process.

9. The method of claim 1, further comprising transmitting at least one of a new data indicator (NDI) for the first HARQ process associated with the unicast data, or a grant for the first HARQ process associated with the unicast data transmission.

10. A method of communications at a network node, comprising:
    transmitting, on a downlink communication channel for a user equipment (UE) and based at least in part on a first identifier associated with the UE, a multicast data transmission comprising first multicast data;
    receiving, on an uplink communication channel for the UE, a negative acknowledgment (NACK) according to a first hybrid automatic repeat request (HARQ) process based on identifying that at least a portion of the first multicast data has not been received;
    transmitting a grant for a unicast data retransmission associated with a cell radio network temporary identifier (C-RNTI) and based at least in part on downlink control information (DCI) mapped to a UE-specific search space;; and
    transmitting, on a downlink communication channel for the UE and based on receiving the NACK, the unicast data retransmission comprising unicast data that includes at least the portion of the first multicast data, the unicast data retransmission using the first HARQ process.

11. The method of claim 10, wherein the grant indicates a HARQ process identifier for feedback for unicast data transmission including the first HARQ process, wherein the HARQ process identifier for feedback for unicast data transmission is associated with at least one HARQ process for feedback for multicast data transmission, wherein a subset of a number of HARQ processes for feedback for unicast data transmission is allocated for the multicast data transmission.

12. The method of claim 10, further comprising:
    receiving a second NACK from a second UE;
    transmitting, for the second UE, a second grant for a second unicast data retransmission based on the C-RNTI; and
    transmitting the second unicast data retransmission comprising second unicast data that includes at least the portion of the first multicast data.

13. The method of claim 10, further comprising:
    receiving a second NACK from a second UE, wherein transmitting the grant includes transmitting the grant to the second UE indicating resource allocation for the unicast data retransmission for a cluster including the UE and the second UE.

14. The method of claim 10, wherein transmitting the grant based on the C-RNTI is based on a UE capability of the UE.

15. The method of claim 10, further comprising transmitting another grant associated with a retransmission radio network temporary identifier (RETX-RNTI) indicating the unicast data retransmission is associated with downlink control information (DCI) of the multicast data transmission.

16. An apparatus for wireless communication, comprising:
a transceiver;
one or more memories configured to store instructions; and
one or more processors communicatively coupled with the transceiver and the one or more memories, wherein the one or more processors are configured to cause the apparatus to:
transmit, on a downlink communication channel for a user equipment (UE) and based at least in part on a first identifier associated with the UE, a multicast data transmission comprising first multicast data;
receive, on an uplink communication channel for the UE, a negative acknowledgment (NACK) according to a first hybrid automatic repeat request (HARQ) process indicating that at least a portion of the first multicast data has not been received; and
transmit, on the downlink communication channel or another downlink communication channel for the UE and based at least in part on a second identifier associated with the UE that is different from the first identifier, a unicast data transmission comprising unicast data, the unicast data transmission using a HARQ process identifier associated with the first HARQ process and different from the first identifier and the second identifier, wherein the unicast data includes at least the portion of the first multicast data.

17. The apparatus of claim 16, wherein the one or more processors are configured to cause the apparatus to select the first HARQ process from one or more HARQ processes available for feedback for unicast data transmission, and associate the first HARQ process with at least the portion of the first multicast data.

18. The apparatus of claim 16, wherein the one or more processors are configured to cause the apparatus to configure, for the UE, a number of HARQ processes permitted for feedback for multicast data transmission from the apparatus.

19. The apparatus of claim 16, wherein the one or more processors are configured to cause the apparatus to configure, for each of multiple UEs including the UE, a number of HARQ processes permitted for feedback for multicast data transmission from the apparatus, wherein the number of HARQ processes is common across the multiple UEs.

20. The apparatus of claim 16, wherein the one or more processors are configured to cause the apparatus to configure, for the UE, a number of HARQ processes for feedback for unicast data transmission and a number of HARQ processes for feedback for multicast data transmission, wherein the number of HARQ processes for unicast data transmission plus the number of HARQ processes for multicast data transmission is below a threshold.

21. The apparatus of claim 16, wherein the one or more processors are configured to cause the apparatus to configure, for the UE, a number of HARQ processes for feedback for unicast data transmission including an allocated number of HARQ processes for feedback for multicast data transmission from the number of HARQ processes for feedback for unicast data transmission.

22. The apparatus of claim 21, wherein the first HARQ process corresponds to one of the allocated number of HARQ processes for feedback for multicast data transmission from the number of HARQ processes for feedback for unicast data transmission.

23. The apparatus of claim 16, wherein the one or more processors are configured to cause the apparatus to transmit the unicast data that includes at least the portion of the first multicast data according to the first HARQ process.

24. The apparatus of claim 16, wherein the one or more processors are configured to cause the apparatus to transmit at least one of a new data indicator (NDI) for the first HARQ process associated with the unicast data, or a grant for the first HARQ process associated with the unicast data transmission.

25. An apparatus for wireless communication, comprising:
a transceiver;
one or more memories configured to store instructions; and
one or more processors communicatively coupled with the transceiver and the one or more memories, wherein the one or more processors are configured to cause the apparatus to:
transmit, on a downlink communication channel for a user equipment (UE) and based at least in part on a first identifier associated with the UE, a multicast data transmission comprising first multicast data;
receive, on an uplink communication channel for the UE, a negative acknowledgment (NACK) according to a first hybrid automatic repeat request (HARQ) process based on identifying that at least a portion of the first multicast data has not been received;
transmit a grant for a unicast data retransmission associated with a cell radio network temporary identifier (C-RNTI) and based at least in part on downlink control information (DCI) mapped to a UE-specific search space; and
transmit, on a downlink communication channel for the UE and based on receiving the NACK, the unicast data retransmission comprising unicast data that includes at least the portion of the first multicast data, the unicast data retransmission using the first HARQ process.

26. The apparatus of claim 25, wherein the grant indicates a HARQ process identifier for feedback for unicast data transmission including the first HARQ process, wherein the HARQ process identifier for feedback for unicast data transmission is associated with at least one HARQ process for feedback for multicast data transmission, wherein a subset of a number of HARQ processes for feedback for unicast data transmission is allocated for the multicast data transmission.

27. The apparatus of claim 25, wherein the one or more processors are configured to cause the apparatus to:
receive a second NACK from a second UE;
transmit, for the second UE, a second grant for a second unicast data retransmission based on the C-RNTI; and
transmit the second unicast data retransmission comprising second unicast data that includes at least the portion of the first multicast data.

28. The apparatus of claim 25, wherein the one or more processors are configured to cause the apparatus to receive a second NACK from a second UE, and transmit the grant to the second UE indicating resource allocation for the unicast data retransmission for a cluster including the UE and the second UE.

29. The apparatus of claim 25, wherein the one or more processors are configured to cause the apparatus to transmit the grant based on the C-RNTI based on a UE capability of the UE.

30. The apparatus of claim 25, wherein the one or more processors are configured to cause the apparatus to transmit another grant associated with a retransmission radio network temporary identifier (RETX-RNTI) indicating the unicast data retransmission is associated with downlink control information (DCI) of the multicast data transmission.

\* \* \* \* \*